Patented Mar. 31, 1936

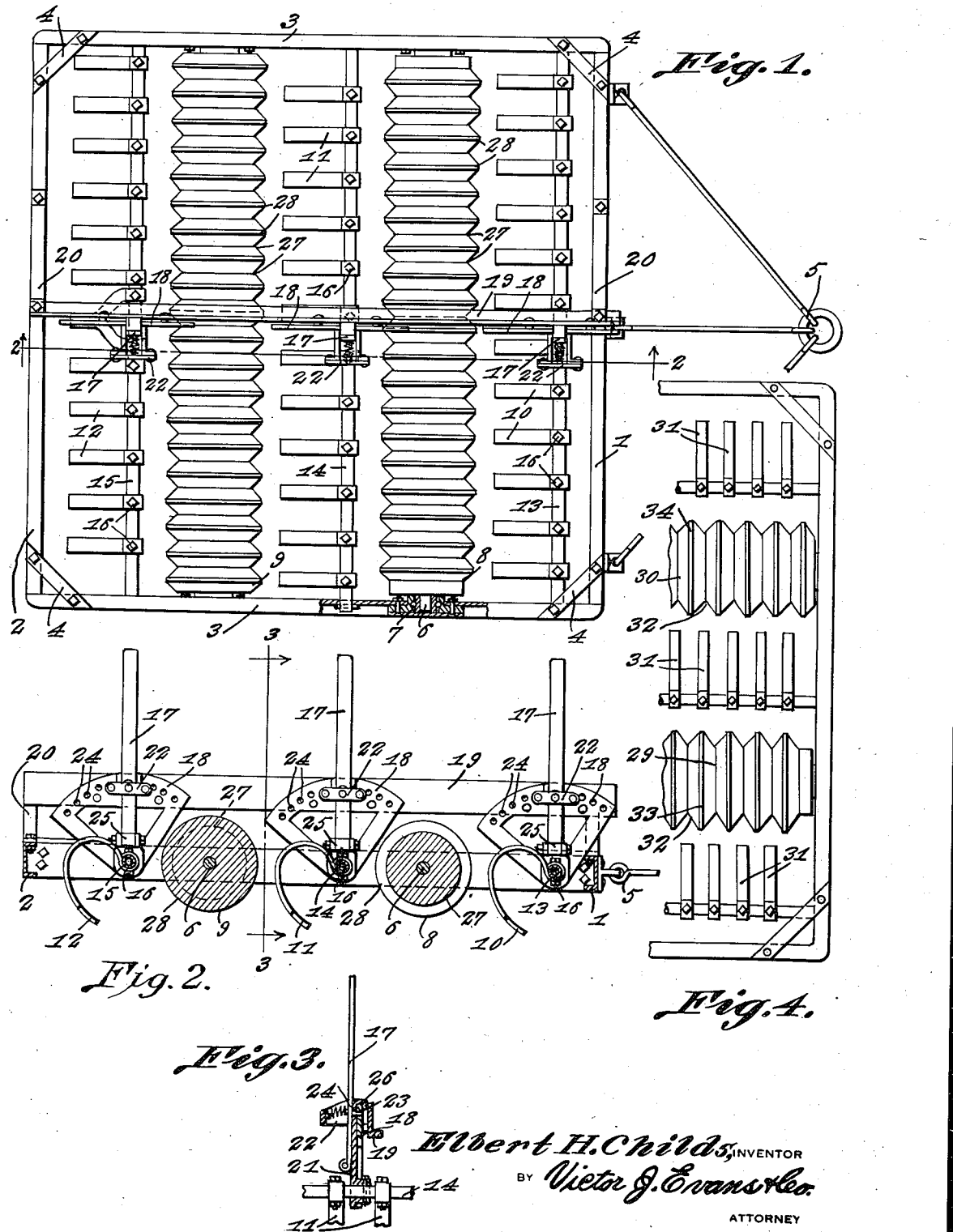

2,035,591

UNITED STATES PATENT OFFICE 2,035,591

COMBINED HARROW AND PULVERIZER

Elbert H. Childs, Holcomb, N. Y.

Application June 10, 1935, Serial No. 25,879

2 Claims. (Cl. 55—12)

My invention relates to improvements in combined harrows and pulverizing implements for use in breaking up soil and crushing clods preparatory to seeding or planting.

Generally speaking, the primary object of my invention is to provide a practical implement adapted for alternately harrowing and rolling soil in a succession of operations such that the entire surface traversed by the implement is broken up and subjected to compression forces directed obliquely thereagainst, in substantially opposite directions to crush and disintegrate the lumps and clods.

Other and subordinate objects will presently appear and the nature of my improvements will be readily understood when the following description and claims are read in conjunction with the accompanying drawing.

In said drawing:

Figure 1 is a view in top plan of a preferred embodiment of my invention.

Figure 2 is a view in vertical transverse section taken on the line 2—2 of Figure 1 and looking in the direction indicated by the arrows.

Figure 3 is a view in vertical section taken on the line 3—3 of Figure 2 and looking in the direction indicated by the arrows, and, Figure 4 is a fragmentary view in top plan of a modified form of the invention.

Reference being had to the drawing, my invention in its preferred embodiment comprises a preferably rectangular frame formed of any suitable material and comprising a front bar 1, a rear bar 2, side bars 3, respectively, and corner braces 4. To the front bar 1 a suitable draft rigging 5 is secured, in any suitable manner, for the attachment to the implement of a tractor or draft animals as the case may be.

Journaled at their opposite ends in the side bars 3, as by arbors 6, and anti-friction bearings 7, is a pair of front and rear ground rollers 8 and 9, respectively, extending transversely of the frame in parallel spaced apart relation and spaced from the rear and front end bars 1 and 2.

Mounted in the frame, as presently described, are three gangs or sets of curved spring harrow teeth 10, 11, and 12, respectively, disposed one in front of the front roller 8, one in front of the rear roller 9 and one in the rear of said last roller. The gangs of harrow teeth 10, 11, and 12 are secured upon rock shafts 13, 14, and 15, respectively, journaled at their opposite ends in the side bars 3 parallel with the rollers 8 and 9. Bolts 16 passing through the rear ends of said harrow teeth secure the same to their respective rock shafts. Each rock shaft 13, 14, and 15 has secured thereto an upstanding hand lever 17 for rocking the shaft to adjust the depth of the harrow teeth in the ground. Each hand lever 17 is held in set position by a detent segment 18 mounted upon a bar 19 secured to the frame by uprights 20, a rocking detent arm 21 fast on the rock shaft and having a boxing 22 thereon through which the hand lever passes, and a spring urged detent pin 23 mounted in said boxing for engaging apertures 24 in said segment and for movement to a disengaged position by movement of the lever 17 lateral. The connection of the hand levers 17 to their respective rock shaft 13, 14, and 15 includes a hinge 25 permitting such lateral movement. The upper end of each detent arm 21 is bent over its related segment 18, as at 26, to be guided by said segment in its rocking movement.

A particular feature of my invention is the construction of the rollers 8 and 9 and the relation of the harrow teeth in each gang to those in the other gangs. The rollers 8 and 9 are provided with radial circumferential grooves 27 equidistantly spaced apart longitudinally of said rollers and forming therebetween radial circumferential ribs 28. Preferably the grooves 27 and ribs 28 are substantially V shaped in cross section. By virtue of this feature the surface of the soil is subjected to compression forces directed thereagainst obliquely and in opposite directions to crush and pulverize the same. As will be clear during this operation said rollers 8 and 9 form ridges in the soil. Preferably the grooves 27 and ribs 28 of one roller are staggered relative to those of the other roller so that the ribs of the rear roller 9 break down and crush the ridges formed by the front roller 8. The harrow teeth 10 of each gang are staggered relative to those of the other gangs so that the entire surface traversed by the implement is broken up as will be clear, that is to say, when all the gangs of harrows are used. However, each gang of said harrow teeth is independently adjustable to an effective position so that the latter operation may be varied if desired.

In the modification shown in Figure 5 the implement includes front and rear ground rollers 29 and 30, constructed and arranged as described with reference to the preferred form of the invention, and gangs of harrow teeth 31. In this instance the teeth 28 of each gang of harrows are related to the teeth of the other gangs just as described with reference to the preferred embodiment of the invention. However, in this instance, the teeth 31 of the first gang of harrows are aligned with the grooves 32 in the front ground roller 29 and those of the intermediate gang with the grooves 32 of the rear roller 30. Hence in this form of the invention the front gang of harrow teeth cuts furrows and intermediate ridges in the soil which are broken down by the ribs 33 of the front ground roller 29 and the intermediate gang of harrow teeth 31 acts to cut furrows in said broken down ridges while the ribs 34 of the rear ground roller 30 act to break down said ridges. The result is a more complete breaking up and pulverizing of the ground traversed as will be manifest.

Although I have described a preferred embodiment of my invention and one modification thereof it is to be understood that the invention is not to be confined to the precise details of construction and relation of parts set forth and that right is herein reserved to other modifications falling within the scope of the claims appended hereto.

What I claim is:

1. An implement of the class described comprising a frame, a plurality of ground rollers rotatably mounted in said frame transversely thereof in parallel spaced apart relation and each having radial circumferential grooves therein and radial circumferential ribs intermediate said grooves substantially V shaped in cross section, the ribs of one roller being staggered relative to those of the other roller to track in the paths of the grooves of said other roller, and a gang of harrow teeth related to each of said rollers, the teeth of said gangs being aligned with the grooves of their related rollers.

2. An implement of the class described comprising a frame, a pair of front and rear ground rollers, respectively, rotatably mounted in said frame transversely thereof in parallel spaced apart relation and each having radial circumferential grooves therein and radial circumferential ribs intermediate said grooves substantially V shaped in cross section, the ribs of one roller being staggered relative to those of the other to track in the paths of the grooves of said other roller, a gang of harrow teeth in front of each roller, the teeth of each gang being aligned with the grooves of one or the other of said rollers, respectively, and a gang of harrow teeth in the rear of the rear roller having the teeth thereof staggered relative to the teeth of the other gangs.

ELBERT H. CHILDS.